United States Patent
Kuroda et al.

[11] Patent Number: 5,493,901
[45] Date of Patent: Feb. 27, 1996

[54] COMBUSTION STATE-DETECTING SYSTEM FOR INTERNAL COMBUSTION ENGINES

[75] Inventors: Shigetaka Kuroda; Yuichi Shimasaki; Kazutomo Sawamura, all of Wako, Japan

[73] Assignee: Honda Giken Kogyo Kabushiki Kaisha, Tokyo, Japan

[21] Appl. No.: 120,832

[22] Filed: Sep. 15, 1993

[30] Foreign Application Priority Data

Sep. 17, 1992 [JP] Japan .................................... 4-273632

[51] Int. Cl.⁶ ................................................ G01M 15/00
[52] U.S. Cl. ...................... 73/116; 73/117.3; 364/431.07; 364/431.08; 123/419; 123/436
[58] Field of Search ...................... 73/116, 117.3; 364/431.07, 431.08; 123/419, 436

[56] References Cited

U.S. PATENT DOCUMENTS

| | | | |
|---|---|---|---|
| 5,044,195 | 9/1991 | James et al. | 73/117.3 |
| 5,117,681 | 6/1992 | Dosdall et al. | |
| 5,197,325 | 3/1993 | Tamura et al. | 73/117.3 |
| 5,200,899 | 4/1993 | Ribbens et al. | |
| 5,245,866 | 9/1993 | Hashiguchi et al. | 364/431.07 |
| 5,263,364 | 11/1993 | Nakayama et al. | 364/431.07 |
| 5,313,395 | 5/1994 | Kawai et al. | 364/431.07 |

FOREIGN PATENT DOCUMENTS 3-286166 12/1991 Japan .

Primary Examiner—Richard E. Chilcot, Jr.
Assistant Examiner—Jewel V. Artis
Attorney, Agent, or Firm—Nikaido, Marmelstein, Murray & Oram

[57] ABSTRACT

A combustion state-detecting system for internal combustion engines has a crank angle sensor which generates a crank angle signal with a predetermined period shorter than a firing period of the engine whenever the crankshaft rotates through a predetermined angle. A value of the rotational speed of the engine is detected whenever the crank angle signal is generated. A first average value of the detected engine rotational speed is calculated over every period of one rotation of the crankshaft, followed by calculating a second average value of the first average value over every firing period, to thereby calculate a rate of variation in the second average value over every firing period. Values of the rate of variation are averaged over a predetermined number of ignition cycles of the engine, to obtain a third average value. A cumulative value of the absolute value of a difference between the third average value and the rate of variation is calculated over the above predetermined number of ignition cycles. The cumulative value is compared with a predetermined value, to determine that the engine is in a degraded state of combustion, when the cumulative value exceeds the predetermined value.

6 Claims, 10 Drawing Sheets

COMBUSTION STATE-DETECTING SYSTEM FOR INTERNAL COMBUSTION ENGINES

BACKGROUND OF THE INVENTION

1. Field of the Invention

This invention relates to a combustion state-detecting system for detecting a state of combustion (misfiring) in internal combustion engines, based upon a variation in the angular velocity of the crankshaft during rotation of the engine in every combustion cycle.

2. Prior Art

To detect a cylinder of an internal combustion engine in which normal combustion does not take place due to failure in the ignition system, the fuel supply system or the like, there is conventionally known an abnormality-detecting system which detects a rate of variation in the angular velocity of the crankshaft during rotation of the engine in every combustion cycle, to thereby determine whether or not an abnormality has occurred in any of the cylinders, based upon the detected rate of variation, as proposed, for example, by Japanese Provisional Patent Publication (Kokai) No. 3-286166.

According to the above conventional system, an output from a crank angle sensor provided at the crankshaft is directly supplied to the abnormality-detecting system, and the pulse repetition period of the sensor output is measured to detect the rotational speed of the crankshaft. However, in actuality the output from the crank angle sensor always varies due to various factors, such as rotational speed vibration components due to dimensional errors (manufacturing tolerances, mounting tolerances, etc.) of the crank angle sensor, dynamic errors of the engine per se (eccentric movement, torsion, etc. of the crankshaft), or secondary rotational speed variation components due to the combustion and compression of the engine. Therefore, when such dimensional errors of the angle sensor or dynamic errors of the engine per se are large, or when the engine is in an operating condition where the rotational speed variation components are large, the abnormality determination cannot be accurately performed.

Further, according to the conventional system, in the event of occurrence of a single misfire (i.e. a misfire occurring in only one cylinder), the engine can undergo reactive vibrations due to the misfire, causing fluctuations in the angular velocity of the crankshaft. As a result, it is erroneously determined that a plurality of misfires have occurred, though actually a single misfire has occurred.

Still further, when misfires occur in a plurality of cylinders irregularly or at random, the conventional system is not capable of identifying the cylinders which actually undergo the misfires.

SUMMARY OF THE INVENTION

It is the object of the invention to provide a combustion state-detecting system for internal combustion engines, which is capable of positively determining the combustion state of the engine even when an output from a crank angle sensor varies, to thereby accurately detect an abnormality in the combustion state of the engine.

To attain the above object, the present invention provides a combustion state-detecting system for an internal combustion engine having at least one spark plug, and a crankshaft, comprising:

crank angle signal-generating means for generating a crank angle signal with a predetermined period shorter than a firing period of the spark plug whenever the crankshaft rotates through a predetermined angle;

engine speed-detecting means for detecting a value of rotational speed of the engine whenever the crank angle signal is generated;

first averaging means for continuously averaging values of the rotational speed of the engine detected by the engine speed-detecting means, over a period of one rotation of the crankshaft, to obtain a first average value;

second averaging means for averaging the first average values of the engine rotational speed obtained by the first averaging means, over the firing period of the spark plug, to obtain a second average value;

variation rate-calculating means for calculating a value of a rate of variation in the second average value of the rotational speed of the engine obtained by the second averaging means, over the firing period of the spark plug;

variation rate average value-calculating means for averaging values of the rate of variation obtained by the variation rate-calculating means, over a predetermined number of ignition cycles of the engine, to obtain a third average value;

difference cumulative value-calculating means for calculating a difference between the third average value obtained by the variation rate average value-calculating means and the value of the rate of variation obtained by the variation rate-calculating means, and for calculating a cumulative value of an absolute value of the difference over the predetermined number of ignition cycles; and combustion state-determining means for comparing the cumulative value with a predetermined value, and for determining that the engine is in a degraded state of combustion, when the cumulative value exceeds the predetermined value.

To determine a cylinder in which a misfire has occurred, the combustion state-determining means includes sign change-determining means for determining a change in sign of the value of the rate of variation by determining whether there has been a change in a direction of change of the rate of variation from a direction in which deceleration of the rotational speed of the engine increases to a direction in which the rotational speed of the engine decreases, within a time period corresponding to the predetermined number of ignition cycles before the time the cumulative value is determined to exceed the predetermined value. When there has been the above change in the sign of the rate of variation, the combustion state-determining means determines that one of the at least one cylinder of the engine which was ignited in a first ignition cycle immediately before a second ignition cycle corresponding to the time point of occurrence of the change in the sign of the rate of variation underwent a degradation in combustion state thereof.

To discriminate a misfiring cylinder from the other cylinders, the combustion state-determining means includes variation rate-comparing means for comparing the value of the rate of variation in the second ignition cycle of the engine corresponding to the time point of occurrence of the change in the sign of the value of the rate of variation, with the value of the rate of variation in a third ignition cycle of the engine preceding the second ignition cycle by a second predetermined number of ignition cycles larger than the first mentioned predetermined number of ignition cycles, when the change in the sign has occurred while at the same time the cumulative value exceeds the predetermined value. When the value of the rate of variation in the second ignition cycle is larger than the value of the rate of variation in the third ignition cycle, the combustion state-determining means determines that one of the at least one cylinder of the engine which was ignited in the first ignition cycle of the engine immediately before the second ignition cycle underwent a degradation in combustion state thereof.

Preferably, the combustion state-detecting system includes engine load-detecting means for detecting load on the engine, and wherein the predetermined value is set in accordance with the rotational speed of the engine detected by the engine speed-detecting means and the load on the engine detected by the engine load-detecting means.

Further preferably, the combustion state-detecting system includes abnormality-determining means for determining an abnormality in the engine or at least one control system for the engine, based on a result of determination by the combustion state-determining means.

Also preferably, the engine speed-detecting means detects the rotational speed of the engine based on time intervals of generation of the crank angle signal.

The above objects, features, and advantages of the invention will be more apparent from the following detailed description taken in conjunction with the accompanying drawings.

BRIEF DESCRIPTION OF THE DRAWINGS

FIG. 2(a) and FIG. 2(b) are flowcharts showing programs (main routines) for determining a state of combustion of the engine, in which:

FIG. 2(a) shows a CRK processing which is executed in synchronism with generation of a crank angle (CRK) signal; and FIG. 2(b) shows a TDC processing which is executed in synchronism with generation of a top dead center (TDC) signal;

DETAILED DESCRIPTION

The invention will now be described in detail with reference to the drawings showing embodiments thereof.

Figure 1:
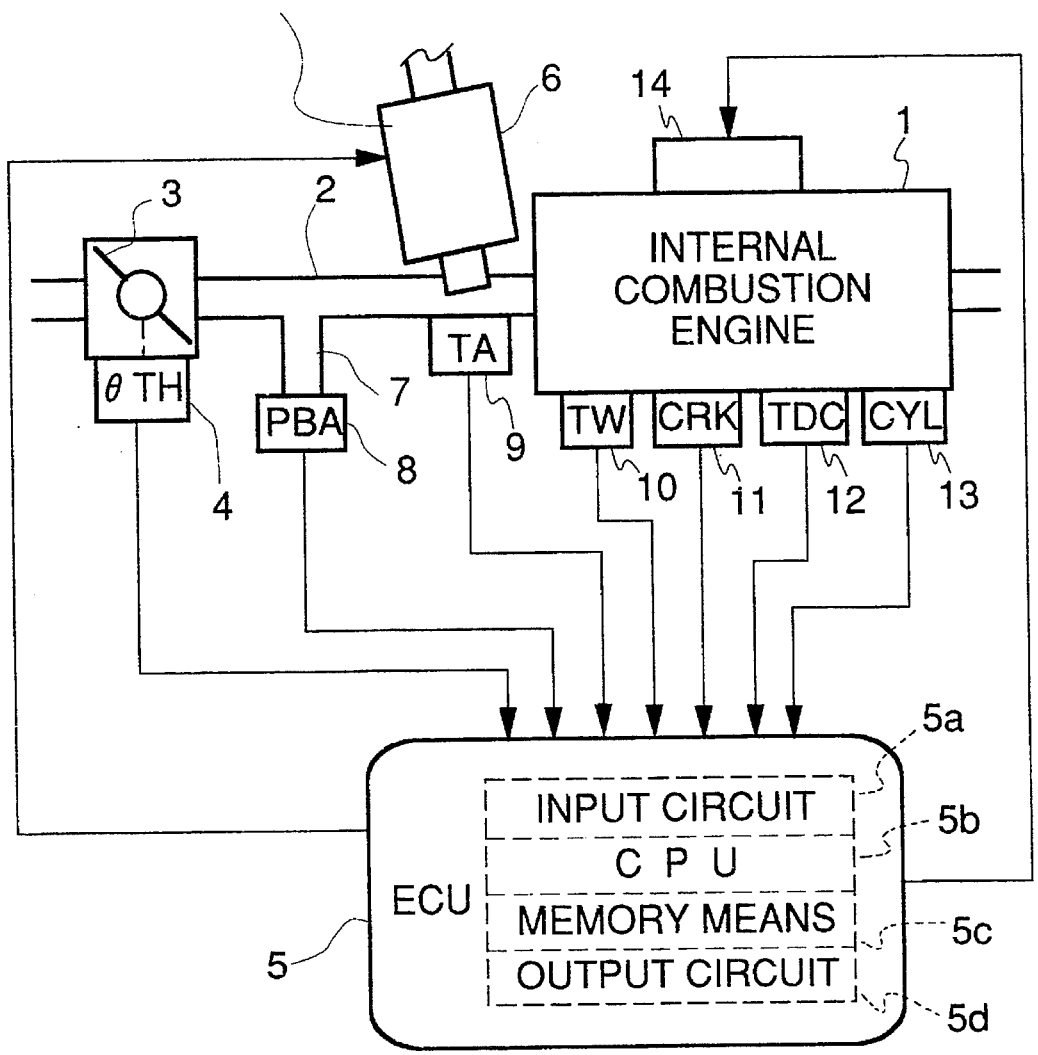
FIG. 1 is a block diagram showing the whole arrangement of an internal combustion engine incorporating a combustion state-detecting system according to an embodiment of the invention.

Referring first to FIG. 1, there is shown the whole arrangement of an internal combustion engine incorporating a combustion state-detecting system according to an embodiment of the invention. In an intake pipe 2 of the engine 1, there is arranged a throttle valve 3, to which is connected a throttle valve opening (θTH) sensor 4 for generating an electric signal indicative of the sensed throttle valve opening and supplying the same to an electronic control unit (hereinafter referred to as "the ECU") 5.

Fuel injection valves 6 are provided for each cylinder and arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at predetermined crank angle of a particular cylinder of the engine 1. These sensors 11 to 13 are formed of a magnetic pickup or a pulser. The TDC sensor 12 generates a TDC signal pulse at predetermined crank angle before a top dead center point (TDC) of each cylinder corresponding to the start of the intake stroke of the cylinder (e.g. whenever the crankshaft rotates through 180 degrees when the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 14, which is electrically connected to the ECU 5.

The ECU 5 comprises an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c scoring various operational programs which are executed by the CPU 5b and for storing results of calculations therefrom, etc., and an output circuit 5d which outputs driving signals to the fuel injection valves 6 and the spark plugs 14.

The CPU 5b operates in response to signals from the above-mentioned sensors to determine operating conditions in which the engine 1 is operating, and calculates, based upon the determined engine operating conditions, a fuel injection period of each of the fuel injection valves 6 and ignition timing of each of the spark plugs 14, which are energized in synchronism with TDC signal pulses, to thereby generate driving signals for driving the fuel injection valves 6 and the spark plugs 14 via the output circuit 5d.

Figure 2A:
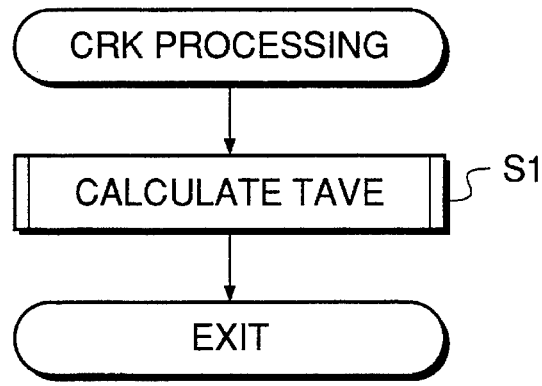
Figure 2B:
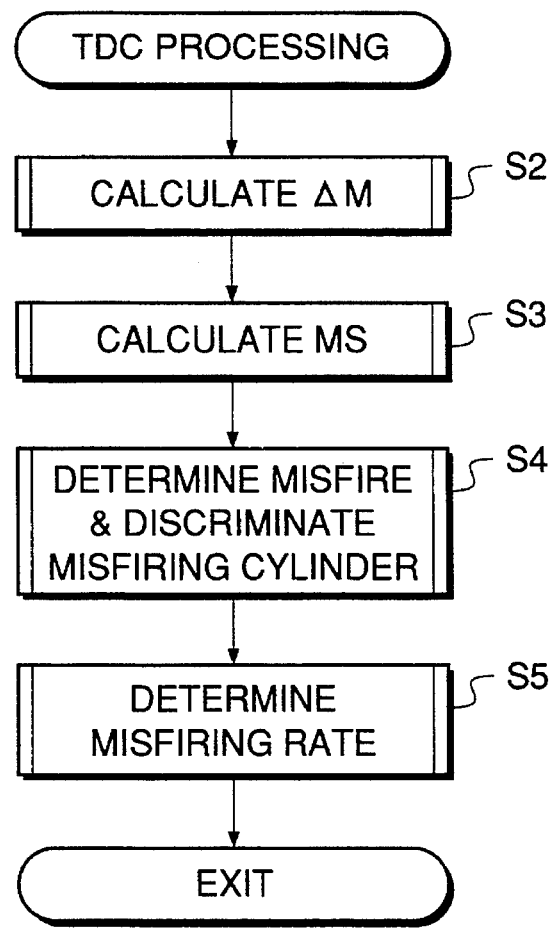

FIG. 2(a) and FIG. 2(b) show main routines which are executed by the CPU 5b for determining a state of combustion of the engine 1.

FIG. 2(a) shows a CRK processing carried out in synchronism with generation of CRK signal pulses. At a step S1 of the program, an average value TAVE or average rotational speed value (hereinafter referred to as "the first average value") of time intervals of occurrence of CRK signal pulses is calculated. The time intervals are proportional to the reciprocal of the engine rotational speed.

FIG. 2(b) shows a TDC processing carried out in synchronism with generation of TDC signal pulses. At a step S2, a rate of variation $\Delta M$ of an average value M (hereinafter referred to as "the second average value") of the first average value TAVE calculated by the CRK processing at the step S1 is calculated. Then, at a step S3, a calculation is made of a cumulative value MS of the absolute value of the difference between the rate of variation $\Delta M$ (hereinafter referred to as "the difference cumulative value") and an average value of the same. Then, it is determined at a step S4 whether or not a misfire has occurred in the engine 1 and which of the cylinders undergoes the misfire, based on the rate of variation $\Delta M$ of the second average value M and the difference cumulative value MS, followed by determining whether or not an abnormality exists in the engine at a step S5, based on the number of times of a determination that a misfire has occurred, obtained at the step S4.

Figure 3:
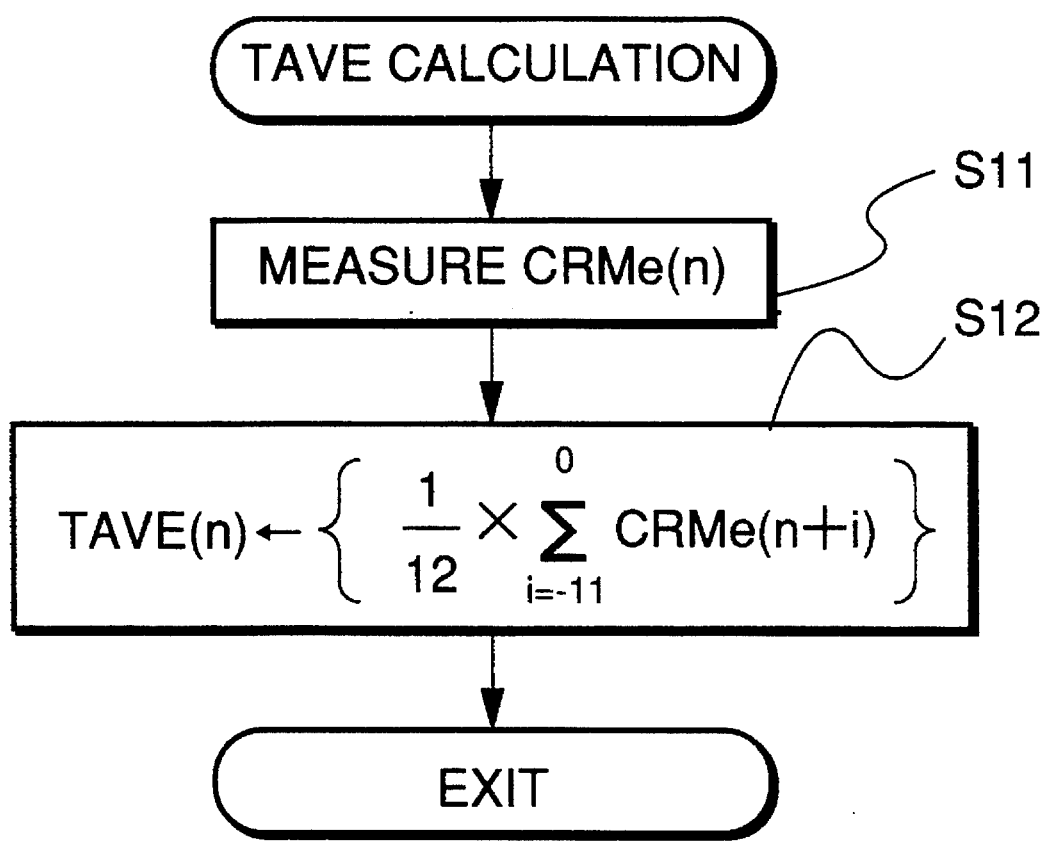
FIG. 3 is a flowchart showing a subroutine for calculating an average value TAVE at a step of the FIG. 2(a) main routine.
Figure 4:
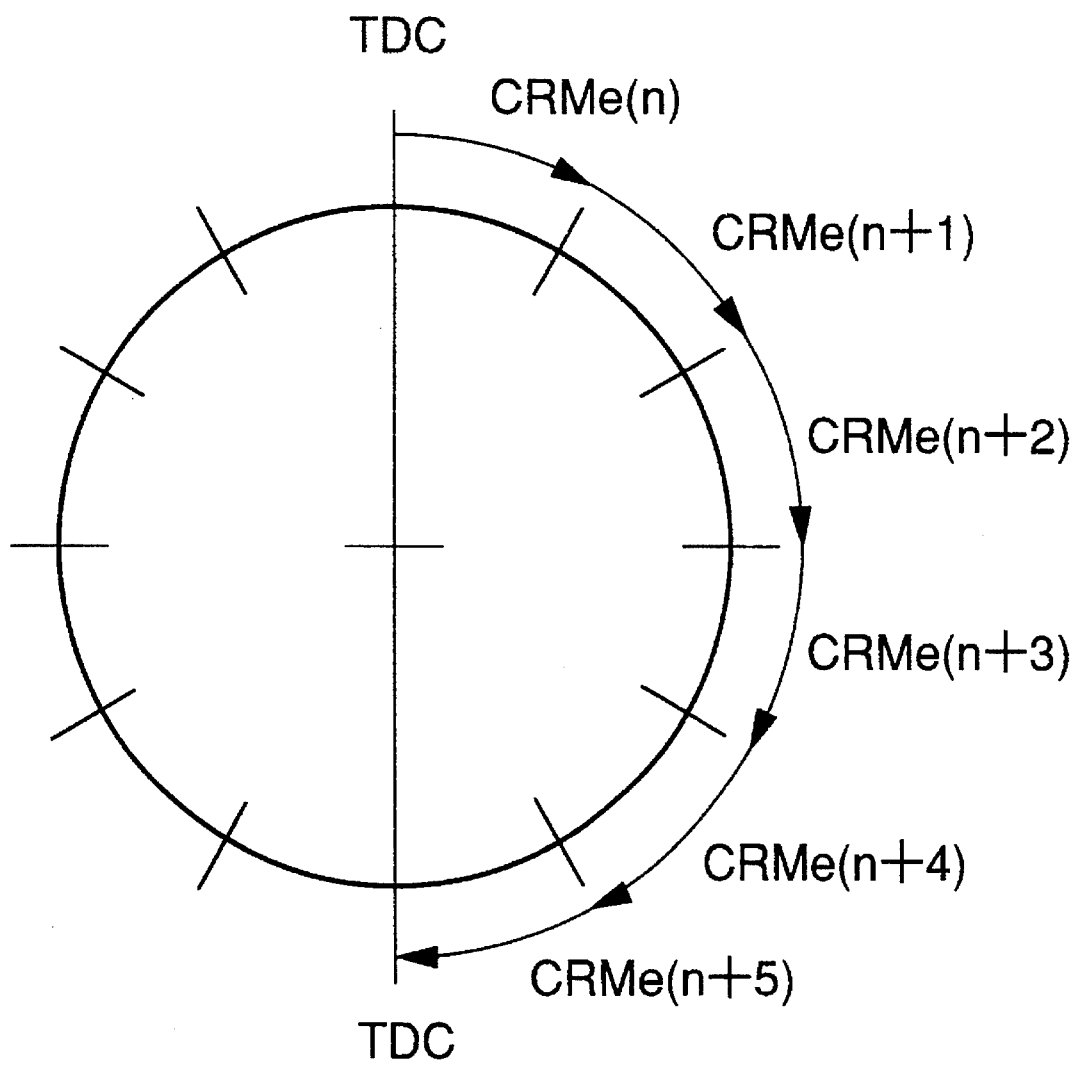
FIG. 4 is a diagram showing the relationship between measuring of parameters indicative of engine rotational speed and the rotational angle of a crankshaft.

FIG. 3 shows a subroutine for calculating the first average value TAVE at the step S1 of the FIG. 2(a) main routine. At a step S11, time intervals CRMe(n) of occurrence of CRK signal pulses are calculated. More specifically, time interval values of CRMe(n), CRMe(n+1), CRMe(n+2) . . . are successively measured whenever the crankshaft rotates through 30 degrees, as shown in FIG. 4.

At a step S12, a first average value TAVE(n) is calculated, which is an average value of 12 CRMe values from a value CRMe(n−11) measured eleven loops before the present loop to a value CRMe(n) in the present loop, by the use of the following equation (1):

$$TAVE(n) = 1/12 \times \sum_{i=-11}^{0} CRMe(n+i) \qquad (1)$$

In the present embodiment, since CRK signal pulses are each generated whenever the crankshaft rotates through 30 degrees, the first average value TAVE(n) is an average value obtained over one rotation of the crankshaft. The first average value TAVE(n) obtained by such averaging every period of one rotation of the crankshaft is free of the influence of primary vibration components in engine rotation over one rotation of the engine, i.e. noise components due to dimensional errors (such as manufacturing tolerances and mounting tolerances) of a pulser or a pickup forming the crank angle sensor 11.

The engine rotational speed NE is also calculated based on the TAVE(n) value.

Figure 5A:
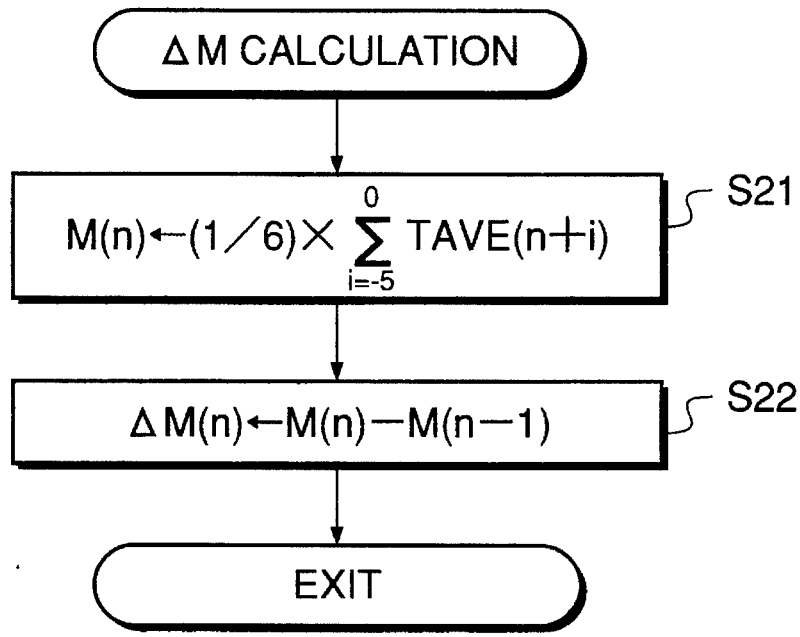
FIG. 5(a) and FIG. 5(b) are flowcharts showing a subroutine for calculating a rate of variation ΔM at a step of the FIG. 2(b) main routine.

FIG. 5(a) shows a subroutine for calculating the rate of variation $\Delta M$, which is executed at the step S2 of the FIG. 2(b) main routine.

At a step S21, the second average value M(n) (i.e. average firing period rotational speed value) is calculated by averaging 6 TAVE values from a value TAVE(n−5) obtained five loops before the present loop to a value TAVE(n) in the present loop, by the use of the following equation (2):

$$M(n) = 1/6 \times \sum_{i=-5}^{0} TAVE(n+i) \qquad (2)$$

In the present embodiment, the engine 1 is a 4-cylinder/4-cycle engine, wherein spark ignition is carried out at any one of the cylinders whenever the crankshaft rotates through 180 degrees. Therefore, the second average value M(n) is an average value obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S22, a rate of variation $\Delta M(n)$ of the second average value M(n) thus calculated is calculated by the use of the following equation (3):

$$\Delta M(n) = M(n) - M(n-1) \qquad (3)$$

When a misfire has occurred in the engine 1, the M(n) value increases so that the $\Delta M(n)$ value increases accordingly.

Figure 5B:
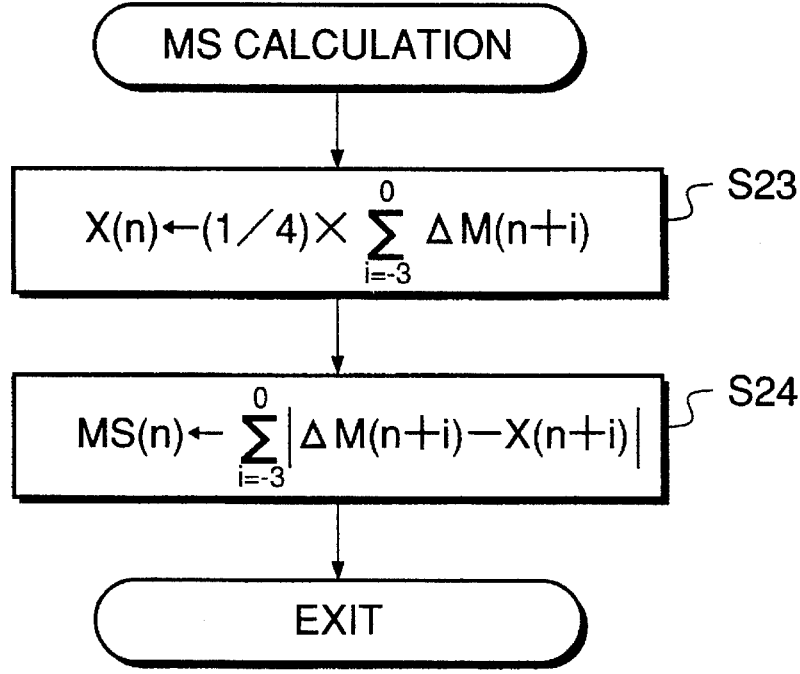

FIG. 5(b) shows a subroutine for calculating the cumulative value MS at the step S3 of the FIG. 2(b) main routine.

At a step S23, a variation rate average value X(n) is calculated by averaging four $\Delta M$ values from a value $\Delta M(n-3)$ three loops before the present loop to a value $\Delta M(n)$ in the present loop, as an average value obtained over a first predetermined number of ignition cycles of the engine, by the use of the following equation (4):

$$X(n) = 1/4 \times \sum_{i=-3}^{0} \Delta M(n+i) \qquad (4)$$

At the following step S24, a cumulative value MS(n) of the absolute value of the difference between the X(n) value and the $\Delta M(n)$ value calculated above is calculated by the use of the following equation (5):

$$MS(n) = \sum_{i=-3}^{0} |\Delta M(n+i) - X(n+i)| \qquad (5)$$

By the above equation (5), a cumulation is made of absolute values of the difference between the variation rate $\Delta M(n)$ and an average value X(n) thereof from a calculated value $|\Delta M(n-3) - X(n-3)|$ obtained three loops before the present loop to a calculated value $|\Delta M(n) - X(n)|$ obtained in the present loop.

The difference cumulative value MS thus calculated assumes a large value when the $\Delta M$ value suddenly and largely increases.

Figure 6:
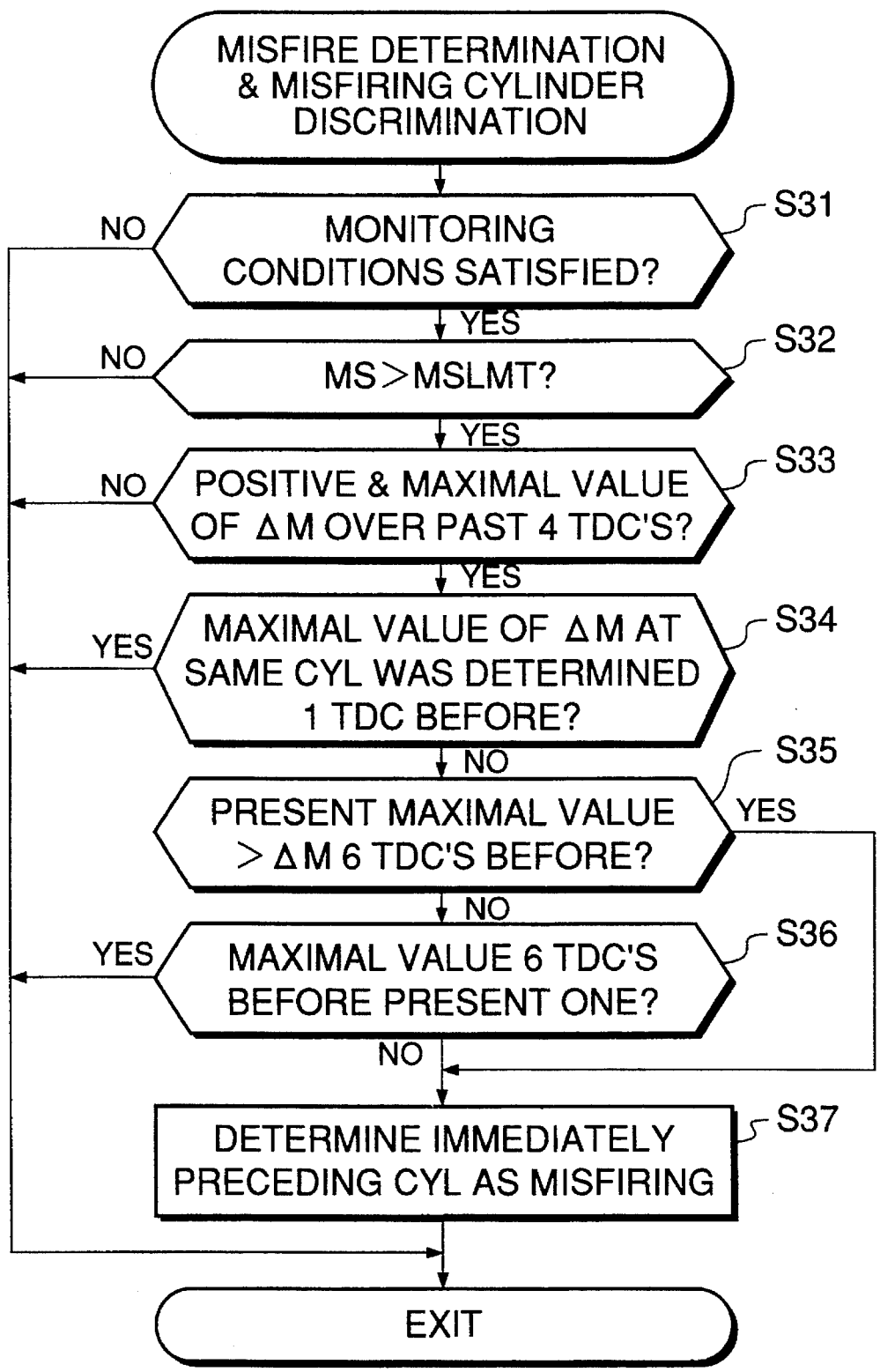
FIG. 6 is a flowchart showing a subroutine for carrying out misfire determination and misfiring cylinder discrimination at a step of the FIG. 2(b) main routine.

FIG. 6 shows a subroutine for carrying out misfire determination and misfiring cylinder discrimination by determining a state of combustion of the engine based on the rate of variation $\Delta M$ and the difference cumulative value MS calculated as above, which is executed at the step S4 of the FIG. 2(b) main routine.

At a step S31, it is determined whether or not monitoring conditions are satisfied, i.e. misfire determination can be carried out. The monitoring conditions are satisfied, for example, when the engine is in a steady operating condition, while at the same time the engine coolant temperature TW, the intake air temperature TA, and the engine rotational speed NE, etc. are all within respective predetermined ranges.

Figure 7:
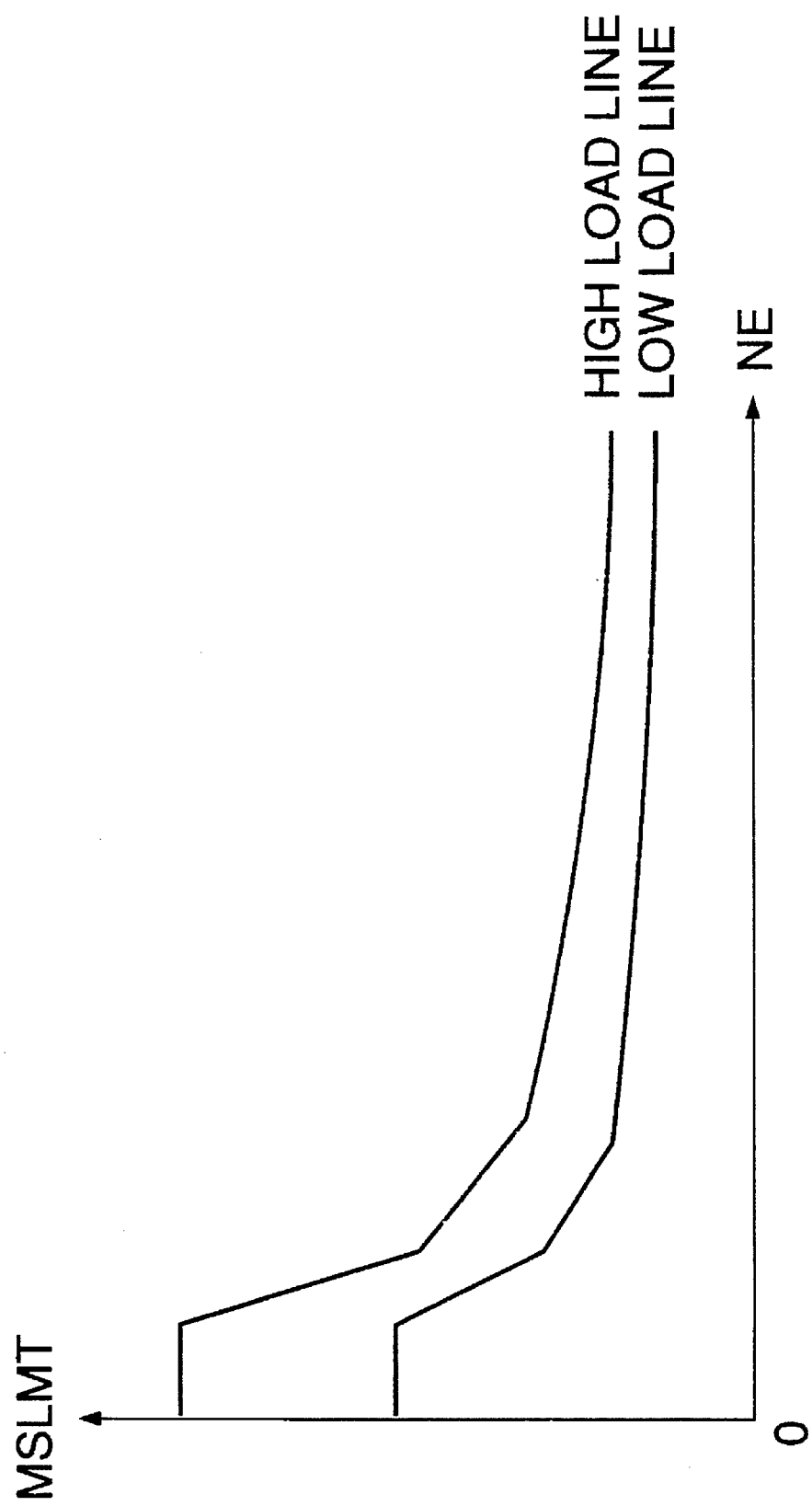
FIG. 7 is a diagram useful in explaining a method of setting a threshold value (MSLMT) for misfire determination.

If the monitoring conditions are not satisfied, the program is immediately terminated, whereas if the monitoring conditions are satisfied, it is determined at a step S32 whether or not the difference cumulative value MS is larger than a predetermined threshold value MSLMT for misfire determination. The predetermined threshold value MSLMT is retrieved from a map, as shown in FIG. 7, which is set in accordance with the engine rotational speed NE and the engine load (intake pipe absolute pressure PBA). The MSLMT value is set to a smaller value as the engine rotational speed NE increases, and to a larger value as the engine load increases, because as the engine rotational speed NE is lower, the combustion period becomes longer and accordingly engine speed variation components become larger, whereas as the engine load is higher, the engine torque becomes larger and accordingly torque variation components become larger.

If the answer to the question of the step S32 is negative (NO), i.e. if MS≦MSLMT is satisfied, the present routine is immediately terminated. On the other hand, if the answer at the step S32 is affirmative (YES), i.e. if MS>MSLMT is satisfied, it is determined that there is a possibility of occurrence of a misfire in a cylinder, and then it is determined at a step S33 whether or not there has been a ΔM value which assumes a positive and maximal value (>0) within a time period over which four TDC signal pulses have been generated (4 TDC's), i.e. over one combustion cycle of the engine, from a time point a third preceding TDC signal pulse before a present TDC signal pulse was generated (3 TDC's before the present loop) to a time point the present TDC signal pulse is generated.

The maximal value is defined such that the ΔM(n−1) has the maximal value if the following equations (6) and (7) are satisfied at the same time:

$$\Delta M(n-1) - \Delta M(n-2) > 0 \quad (6)$$

$$\Delta M(n) - \Delta M(n-1) < 0 \quad (7)$$

Figure 8:
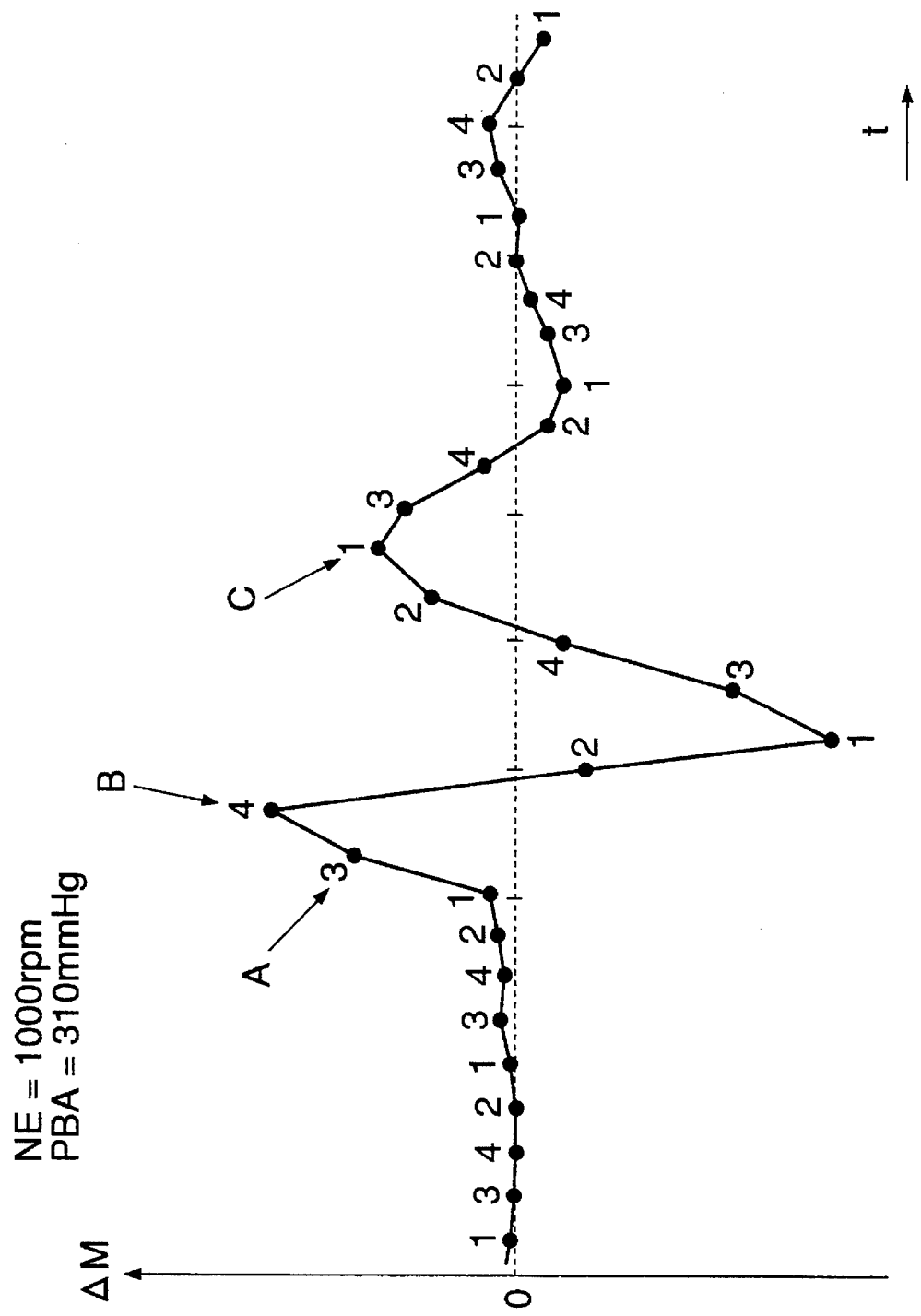
FIG. 8 is a diagram showing a value of a parameter (ΔM) representative of a rate of variation in the engine rotational speed with the lapse of time, in the event of occurrent of a misfire.

FIG. 8 shows, by way of example, a change in the ΔM value with the lapse of time in the case where a single misfire has occurred in a cylinder #3. In the figure, ΔM values corresponding to points B and C have maximal values at which the direction of change of the ΔM value is inverted (ΔM value sign-changing point). Numerals along the ΔM curve in FIG. 8 represent cylinder numbers, the interval between adjacent numerals corresponds to 1 TDC (one ignition cycle). In the present embodiment, the ΔM value represents a degree of deceleration of the engine rotational speed NE. Therefore, when the ΔM value increases toward a maximal value, it means that the engine speed deceleration has increased, whereas when the ΔM value decreases away from a maximal value, it means that the engine speed deceleration has decreased.

If the answer to the question of the step S33 is negative (NO), the program is immediately terminated, whereas if it is affirmative (YES), i.e. if there has been a ΔM value assuming a positive and maximal value over the past 4 TDC period, it is determined at a step S34 whether or not a cylinder corresponding to the maximal value (cylinder #4 indicated by the point B and cylinder #1 by the point C in the FIG. 8 example) was also determined to be a cylinder corresponding to the maximal value 1 TDC before the present loop, i.e. in the last loop of execution of the present program. If the answer to this question is affirmative (YES), the program is immediately terminated to avoid repeated determination of the same cylinder having a maximal value, whereas if the answer is negative (NO), it is determined at a step S35 whether or not the maximal value detected in the present loop is larger than a ΔM value detected 6 TDC's before the present loop (second predetermined number of ignition cycles). That is, in the event of occurrence of a single misfire, a maximal value due to reactive vibrations of the engine occurs 6 TDC's after occurrence of a maximal value due to the misfire.

If the answer to the question of the step S35 is affirmative (YES), i.e. if the maximal value in the present loop is larger than the ΔM value 6 TDC's before the present loop (i.e. if the maximal value in the present loop corresponds to the point B in FIG. 8), it is determined at a step S37 that a misfire occurred in a cylinder which was ignited in a loop immediately before the present loop, i.e. in cylinder #3 corresponding to point A in FIG. 8.

If the answer to the question of the step S35 is negative (NO), i.e. if the maximal value in the present loop is smaller than the ΔM value 6 TDC's before the present loop (i.e. if the maximal value in the present loop corresponds to the point C in FIG. 8), it is determined at a step S36 whether or not the ΔM value 6 TDC's before the present loop was a maximal value. If the answer is affirmative (YES), i.e. if the maximal value in the present loop is not due to a misfire, the program is immediately terminated, whereas if the answer is negative (NO), it is determined at the step S37 that a misfire occurred in a cylinder which was ignited in a loop immediately before the present loop. That is, a maximal value occurs at a cylinder immediately following a cylinder in which a misfire occurred.

Figure 9:
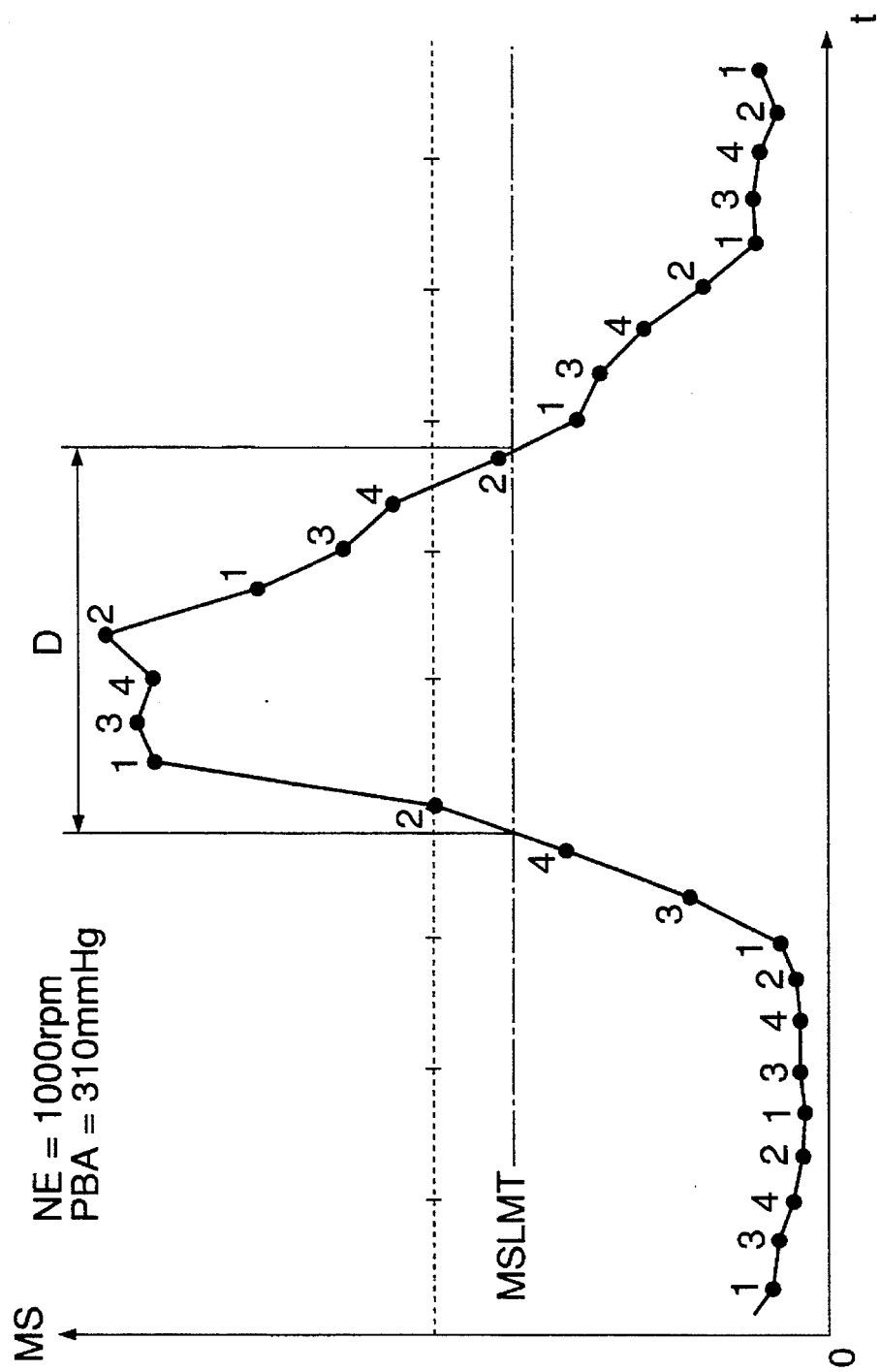
FIG. 9 is a diagram showing a cumulative value (MS) of a difference between a value of the parameter (ΔM) and an average value thereof.

FIG. 9 shows, by way of example, a change in the MS value calculated from the variation rate ΔM shown in FIG. 8. In the figure, numerals along the MS curve represent cylinder numbers, similarly to FIG. 8. As shown in FIG. 9, according to the FIG. 6 program, when the difference cumulative value MS exceeds the threshold value MSLMT, it is determined at the step S32 that there is a possibility of occurrence of a misfire. Then, with respect to the area indicated by symbol D, the determinations of the steps S33 et seq. are carried out. By these determinations, an erroneous judgment can be avoided that a misfire has occurred in the cylinder #1 indicated by the point C in FIG. 8 whose maximal value is caused by reactive vibrations of the engine attributed to a misfire, though actually the misfire occurred in the cylinder #4 indicated by the point B.

By virtue of the determination based on the difference cumulative value MS at the step S32, a large change in the ΔM value which is attributed to a misfire can be positively detected, and at the same time the effect of small variations in the ΔM value on the misfire determination and misfiring cylinder discrimination can be eliminated, thereby improving the accuracy of the determinations of the steps S33 et seq. based on the ΔM value.

Figure 10:
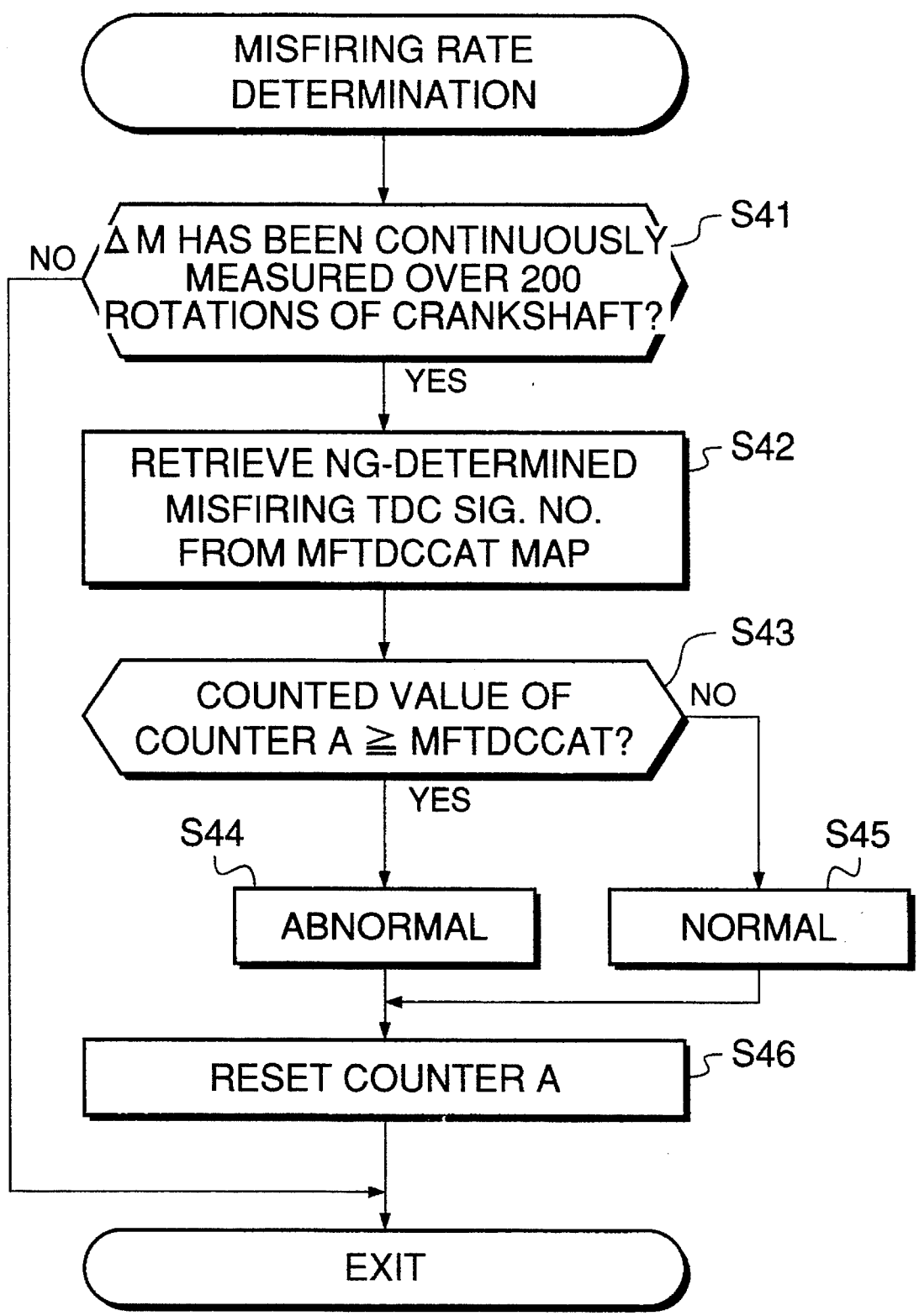
FIG. 10 is a flowchart showing a subroutine for determining a misfiring rate at a step of the FIG. 2(b) main routine.

FIG. 10 shows a subroutine for determining a misfiring rate, which is executed at the step S4 of the FIG. 2(b) main routine.

At a step S41, it is determined whether or not the variation rate (ΔM) has continuously been measured over 200 rotations of the crankshaft after a counter A to be reset at a subsequent step S46, referred to hereinafter, was reset. If the answer to the question of the step S41 is negative (NO), the program is immediately terminated. The counter A counts the number of times of a misfire determination that a misfire occurred in the last cylinder at the step S33 in the FIG. 6 subroutine.

On the other hand, the variation rate (ΔM) has continuously been measured over 200 rotations of the crankshaft, i.e. if the answer to the question of the step S41 is affirmative (YES), an NG-determined misfiring TDC signal pulse number MFTDCCAT is retrieved from an MFTDCCAT map at a step S42. The NG-determined misfiring TDC signal pulse number MFTDCCAT is a threshold value to be used for a determination at the next step S43. The MFTDCCAT map is set in accordance with the engine rotational speed NE and the intake pipe absolute pressure PBA, such that the MFTDCCAT value is set to a smaller value as the NE value increases or as the PBA value increases.

At the following step S43, it is determined whether or not the count value of the counter A is equal to or more than the threshold value MFTDCCAT. If the answer to the question of the step S43 is affirmative (YES), the program proceeds to a step S44, where it is determined that an abnormality exists. On the other hand, if the answer at the step S43 is negative (NO), it is determined at a step S45 that the engine is in a normal condition. Then, the counter A is reset at the step S46, followed by terminating the present routine.

Thus, when the number of times of the misfire determination exceeds a predetermined value, an abnormality is determined to exist in the engine or a control system therefor such as the ignition system and the fuel supply system.

In the above described embodiment, the manner of misfire determination and misfiring cylinder discrimination have been obtained through many experiments and tests, rather than theoretical studies, by detecting various patterns of change characteristics of the ΔM value obtained by artificially causing misfires in engine cylinders. Therefore, the M value change characteristics may vary depending upon the type of engines, the number of cylinders, whether or not the engine is installed on a MT vehicle having a manual transmission or an AT vehicle having an automatic transmission, etc.

In the above described embodiment, as the parameter indicative of the angular velocity of the rotating engine, the repetition period of crank angle pulses of the crankshaft is employed. Accordingly, the maximal value of the ΔM value is used to discriminate a misfiring cylinder (step S33 in FIG. 6). However, any other parameter indicative of the engine angular speed may be employed. If the actual angular speed ω is directly used as the parameter, the angular speed ω is expressed as follows:

$$\omega = (\pi/6) \times (1/T)$$

where T represents the repetition period of crank angle pulses.

Therefore, a rate of variation Δω in the ω value (corresponding to ΔM) largely changes in the negative direction when a misfire has occurred. Accordingly, a minimal value of the Δω value is used instead of a maximal value thereof, for misfiring cylinder discrimination.

According to the above described embodiment, a parameter CRMe indicative of the reciprocal of the rotational speed of the engine is detected based on the crank angle signal. The detected CRMe value is averaged over every period of one rotation of the crankshaft to obtain a first average value TAVE(n). The obtained first average value TAVE is averaged over every firing period of the engine to obtain a second average value M(n). An average value X(n) of a rate of variation ΔM in the obtained second average value M(n) of the engine rotational speed is calculated over a first predetermined number of ignition cycles (e.g. four consecutive ignition cycles). A difference between the calculated variation rate average value X(n) and a variation rate ΔM(n) is calculated, and then a cumulative value MS(n) of the absolute value of the difference is calculated over the first predetermined number of ignition cycles. When the calculated cumulative value MS(n) exceeds a predetermined value MSLMT, it is determined that the engine is in a degraded combustion state, whereby the misfire determination and the misfiring cylinder discrimination can be carried out without being affected by dimensional errors of the engine such as mounting tolerances of a crank angle sensor and combustion change components. As a result, it is possible to positively detect variations in the engine rotational speed attributed to a single misfire, thereby enabling improving the accuracy of detecting a degradation in the combustion state of the engine.

Further, it is determined whether or not there has occurred a change in the sign of the variation rate ΔM, i.e. the direction of change of the variation rate ΔM has been changed from a direction in which the deceleration of the engine rotational speed increases to a direction in which it decreases, within a time period corresponding to the first predetermined number of ignition cycles before the time the difference cumulative value MS(n) is determined to exceed the predetermined value MSLMT. When such a change in the sign has occurred, it is determined that a cylinder which was ignited in an ignition cycle immediately before an ignition cycle corresponding to the time point of occurrence of the change in the sign underwent a degradation in combustion state thereof. Thus, it is possible to accurately determine a cylinder which actually undergoes a degradation in combustion state thereof.

Still further, when the change in the sign has occurred while at the same time the difference cumulative value MS(n) exceeds the predetermined value MSLMT, the variation rate ΔM in a first ignition cycle corresponding to the time point of occurrence of the change in the sign is compared with one in a second ignition cycle preceding the first ignition cycle by a second predetermined number of ignition cycles larger than the first predetermined number of ignition cycles. When the variation rate a M in the first ignition cycle is larger than one in the second first ignition cycle, it is determined that a cylinder which was ignited in a third ignition cycle immediately before the first ignition cycle underwent a degradation in combustion state thereof. Therefore, an erroneous determination can be avoided that a misfire occurred in an ignition cycle immediately before the point C in FIG. 8, thereby eliminating the possibility of a determination that misfires have occurred in a plurality of cylinders, due to reactive vibrations of the engine in the event of a single misfire in a cylinder. Moreover, even when misfires have occurred in a plurality of cylinders irregularly or at random, accurate determination of misfiring cylinders can be made, thus enhancing the accuracy of detection of misfires as well as of discrimination of misfiring cylinders.

What is claimed is:

1. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine speed-detecting means for detecting a value of rotational speed of said engine whenever said crank angle signal is generated;

engine rotational speed averaging means for continuously averaging values of the rotational speed of said engine detected by said engine speed-detecting means, over a period of one rotation of said crankshaft, to obtain an average rotational speed value;

firing period averaging means for averaging said average rotational speed values of the engine rotational speed obtained by said engine rotational speed averaging means, over said firing period of said spark plug, to obtain an average firing period rotational speed value;

variation rate-determining means for determining a value of a rate of variation in said average firing period rotational speed value of the rotational speed of said engine obtained by said firing period averaging means, over said firing period of said spark plug;

variation rate average valve-determining means for averaging values of said rate of variation obtained by said variation rate-determining means, over a predetermined number of ignition cycles of said engine, to obtain an average rate of variation value;

difference cumulative value-determining means for determining a difference between said average rate of variation value obtained by said variation rate average value-determining means and said value of said rate of variation obtained by said variation rate-determining means, and for determining a cumulative value of an absolute value of said difference over said predetermined number of ignition cycles; and combustion state-determining means for comparing said cumulative value with a predetermined value, and for determining that said engine is in a degraded state of combustion, when said cumulative value exceeds said predetermined value.

2. A combustion state-detecting system as claimed in claim 1, wherein said combustion state-determining means includes direction change-determining means for determining a change in sign of said value of said rate of variation by determining whether there has been a change in a direction of change of said rate of variation from a direction in which deceleration of said rotational speed of said engine increases to a direction in which the deceleration of the rotational speed of said engine decreases, within a time period corresponding to said predetermined number of ignition cycles before the time said cumulative value is determined to exceed said predetermined value, said combustion state-determining means determining that at least one cylinder of said engine which was ignited in a first ignition cycle immediately before a second ignition cycle corresponding to a time point of occurrence of said change in said sign of said rate of variation underwent a degradation in combustion state thereof, when there has been said change in said sign of said rate of variation.

3. A combustion state-detecting system as claimed in claim 2, wherein said combustion state-determining means includes variation rate-comparing means for comparing said value of said rate of variation in said second ignition cycle of said engine corresponding to the time point of occurrence of said change in said sign of said value of said rate of variation, with said value of said rate of variation in a third ignition cycle of said engine preceding said second ignition cycle by a second predetermined number of ignition cycles larger than said first predetermined number of ignition cycles, when said change in said sign has occurred while at the same time said cumulative value exceeds said predetermined value, said combustion state-determining means determining that said at least one cylinder of said engine which was ignited in said first ignition cycle of said engine immediately before said second ignition cycle underwent a degradation in combustion state thereof, when said value of said rate of variation in said second ignition cycle is larger than said value of said rate of variation in said third ignition cycle.

4. A combustion state-detecting system as claimed in any of claims 1, 2, or 3, including engine load-detecting means for detecting load said engine, and wherein said predetermined value is set in accordance with the rotational speed of said engine detected by said engine speed-detecting means and the load on said engine detected by said engine load-detecting means.

5. A combustion state-detecting system as claimed in any of claims 1, 2, or 3, including abnormality-determining means for determining an abnormality in said engine or at least one control system for said engine, based on a result of determination by said combustion state-determining means.

6. A combustion state-detecting system as claimed in any of claims 1, 2, or 3, wherein said engine speed-detecting means detects the rotational speed of said engine based on time intervals of generation of said crank angle signal.

* * * * *